United States Patent [19]
Nguyen

[11] Patent Number: 5,379,430
[45] Date of Patent: Jan. 3, 1995

[54] OBJECT-ORIENTED SYSTEM LOCATOR SYSTEM

[75] Inventor: Frank T. Nguyen, Campbell, Calif.

[73] Assignee: Taligent, Inc., Cupertino, Calif.

[21] Appl. No.: 102,080

[22] Filed: Aug. 4, 1993

[51] Int. Cl.⁶ ............................................. G06F 13/00
[52] U.S. Cl. ............................ 395/700; 364/DIG. 1; 364/280.2
[58] Field of Search ......................................... 395/700

[56] References Cited

U.S. PATENT DOCUMENTS

| | | | |
|---|---|---|---|
| 4,821,220 | 4/1989 | Duisberg | 364/578 |
| 4,885,717 | 12/1989 | Beck et al. | 364/DIG. 2 |
| 4,891,630 | 1/1990 | Friedman et al. | 340/706 |
| 4,953,080 | 8/1990 | Dysart et al. | 364/DIG. 1 |
| 5,041,992 | 8/1991 | Cunningham et al. | 364/518 |
| 5,050,090 | 9/1991 | Golub et al. | 364/478 |
| 5,060,276 | 10/1991 | Morris et al. | 382/8 |
| 5,075,848 | 12/1992 | Lai et al. | 395/425 |
| 5,093,914 | 3/1992 | Coplien et al. | 395/700 |
| 5,119,475 | 6/1992 | Smith et al. | 395/156 |
| 5,125,091 | 6/1992 | Staas, Jr. et al. | 395/650 |
| 5,133,075 | 7/1992 | Risch | 395/800 |
| 5,136,705 | 8/1992 | Stubbs et al. | 395/575 |
| 5,151,987 | 9/1992 | Abraham et al. | 395/575 |
| 5,181,162 | 1/1993 | Smith et al. | 364/419 |

*Primary Examiner*—Thomas M. Heckler
*Attorney, Agent, or Firm*—Keith Stephens

[57] ABSTRACT

A method and system for adding system components (documents, tools, fonts, libraries, etc.) to a computer system without running an installation program. A location framework is employed to locate system components whose properties match those specified in a search criteria. The framework receives notification from the system when system components whose properties match the search criteria are added to or removed from the system.

23 Claims, 11 Drawing Sheets

OBJECT-ORIENTED SYSTEM LOCATOR SYSTEM

CROSS-REFERENCE TO RELATED PATENT APPLICATIONS

This patent application is related to the patent application entitled Object-Oriented Locator System, Ser. No. 08/102,098, by Frank Nguyen, filed Aug. 4, 1993, and assigned to Taligent, the disclosure of which is hereby incorporated by reference.

COPYRIGHT NOTIFICATION

This patent application is related to the patent application entitled Container Object System, 08/071,812, by Frank Nguyen, filed Jun. 3, 1993, and assigned to Taligent, the disclosure of which is hereby incorporated by reference.

FIELD OF THE INVENTION

This invention generally relates to improvements in computer systems and more particularly to a system and method for automatically managing system components.

BACKGROUND OF THE INVENTION

Increasingly, system developers are required to make systems and applications easier to use and more intuitive. Many advances have recently occurred in ergonomics, but none have addressed the issue of managing and updating components employed by an application or system program on the fly. A component refers to a document, font, tool, shared library, or other system resource. An example of analogous art is in IBM PS/2 computer. Certain cards that are properly designed to comply with the MicroChannel architecture can be plugged in to a PS/2 system and used without reconfiguring the system. However, the card may still require configuration and any application program requiring resources present on the card must be properly designed, coded, compiled, link-edited and debugged before making use of the resources.

Ideally, system programs and applications should be able to identify system components dynamically. The system should also be able to inform any system programs or applications of resource updates as changes in a system occur. No approach to addressing these problems has, to date, been proposed.

SUMMARY OF THE INVENTION

Accordingly, it is a primary objective of the present invention to add system components (documents, tools, fonts, libraries, etc.) to a computer system without running an installation program. A location framework is employed to locate system components whose properties match those specified in a search criteria. The framework also receives notification from the system when system components whose properties match the search criteria are added to or removed from the system.

The method and system include capability for interactively determining the type of system locator request, obtaining a search criteria and scope of search, querying the system to identify resources that match the specified system search criteria. The system component matches are returned to the initiating requester to enable access to the system component.

DETAILED DESCRIPTION OF THE INVENTION

Figure 1:
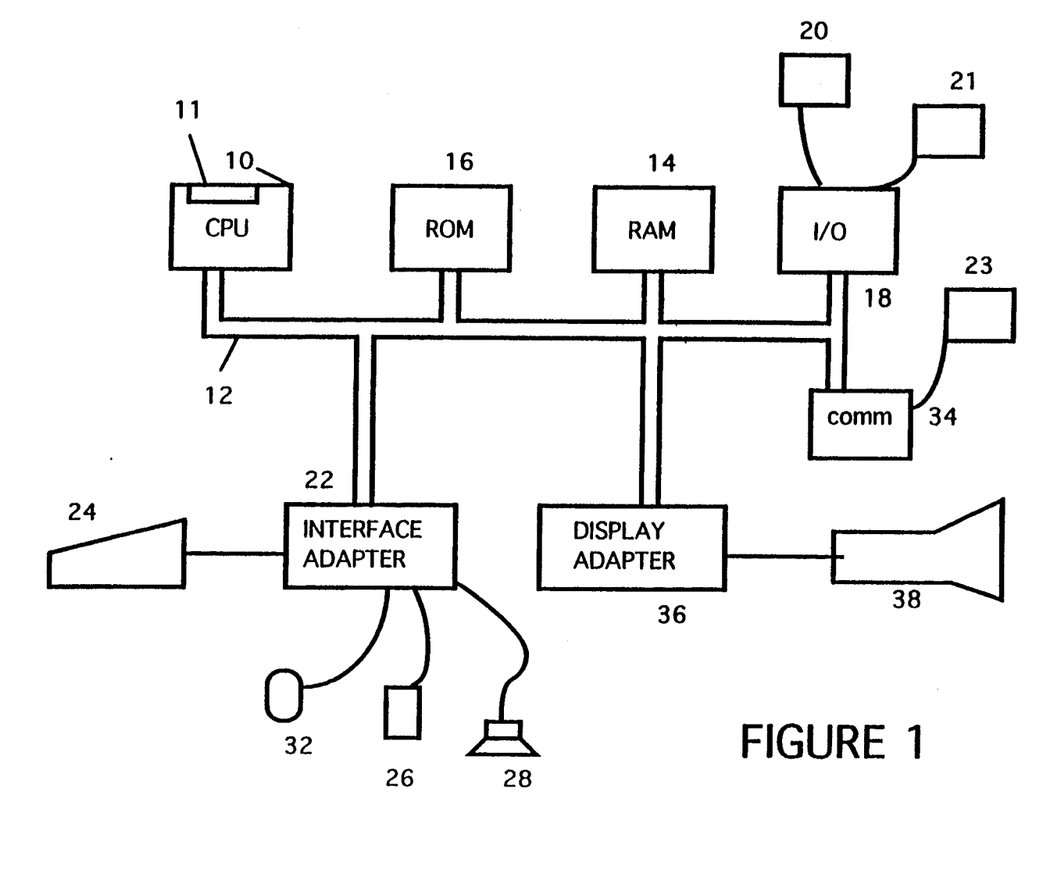
FIG. 1 is a block diagram of a personal computer system in accordance with a preferred embodiment.

The invention is preferably practiced in the context of an operating system resident on a personal computer such as the IBM® PS/2® or Apple® Macintosh® computer. A representative hardware environment is depicted in FIG. 1, which illustrates a typical hardware configuration of a computer in accordance with the subject invention having a central processing unit 10, such as a conventional microprocessor, with a built in non-volatile storage 11, and a number of other units interconnected via a system bus 12. The workstation shown in FIG. 1 includes a Random Access Memory (RAM) 14, Read Only Memory (ROM) 16, an I/O adaptor 18 for connecting peripheral devices such as a disk unit 20, and a diskette unit 21 to the bus, a user interface adapter 22 for connecting a keyboard 24, a mouse 26, a speaker 28, a microphone 32, and/or other user interface devices such as a tough screen device (not shown) to the bus, a communication adapter 34 for connecting the workstation to a data processing network 23 and a display adapter 36 for connecting the bus to a display device 38. The computer has resident thereon an operating system such as the Apple System/7® operating system.

In a preferred embodiment, the invention is implemented in the C++ programming language using object oriented programming techniques. As will be understood by those skilled in the art, Object-Oriented Programming (OOP) objects are software entities comprising data structures and operations on the data. Together, these elements enable objects to model virtually any real-world entity in terms of its characteristics, represented by its data elements, and its behavior, represented by its data manipulation functions. In this way, objects can model concrete things like people and computers, and they can model abstract concepts like numbers or geometrical concepts. The benefits of object technology arise out of three basic principles: encapsulation, polymorphism and inheritance.

Objects hide, or encapsulate, the internal structure of their data and the algorithms by which their functions work. Instead of exposing these implementation details, objects present interfaces that represent their abstractions cleanly with no extraneous information. Polymorphism takes encapsulation a step further. The idea is many shapes, one interface. A software component can made a request of another component without knowing exactly what that component is. The component that receives the request interprets it and figures out according to its variables and data, how to execute the request. The third principle is inheritance, which allows developers to reuse pre-existing design and code. This capability allows developers to avoid creating software from scratch. Rather, through inheritance, developers derive subclasses that inherit behaviors, which the developer then customizes to meet their particular needs.

A prior art approach is to layer objects and class libraries in a procedural environment. Many application frameworks on the market take this design approach. In this design, there are one or more object layers on top of a monolithic operating system. While this approach utilizes all the principles of encapsulation, polymorphism, and inheritance in the object layer, and is a substantial improvement over procedural programming techniques, there are limitations to this approach. These difficulties arise from the fact that while it is easy for a developer to reuse their own objects, it is difficult to use objects from other systems and the developer still needs to reach into the lower non-object layers with procedural Operating System (OS) calls.

Another aspect of object oriented programming is a framework approach to application development. One of the most rational definitions of frameworks come from Ralph E. Johnson of the University of Illinois and Vincent F. Russo of Purdue. In their 1991 paper, *Reusing Object-Oriented Designs,* University of Illinois tech report UIUCDCS91-1696 they offer the following definition: "An abstract class is a design of a set of objects that collaborate to carry out a set of responsibilities. Thus, a framework is a set of object classes that collaborate to execute defined sets of computing responsibilities." From a programming standpoint, frameworks are essentially groups of interconnected object classes that provide a pre-fabricated structure of a working application. For example, a user interface framework might provide the support and "default" behavior of drawing windows, scrollbars, menus, etc. Since frameworks are based on object technology, this behavior can be inherited and overridden to allow developers to extend the framework and create customized solutions in a particular area of expertise. This is a major advantage over traditional programming since the programmer is not changing the original code, but rather extending the software. In addition, developers are not blindly working through layers of code because the framework provides architectural guidance and modeling but at the same time free them to then supply the specific actions unique to the problem domain.

From a business perspective, frameworks can be viewed as a way to encapsulate or embody expertise in a particular knowledge area. Corporate development organizations, Independent Software Vendors (ISV)s and systems integrators have acquired expertise in particular areas, such as manufacturing, accounting, or currency transactions as in our example earlier. This expertise is embodied in their code. Frameworks allow organizations to capture and package the common characteristics of that expertise by embodying it in the organization's code. First, this allows developers to create or extend an application that utilizes the expertise, thus the problem gets solved once and the business rules and design are enforced and used consistently. Also, frameworks and the embodies expertise behind the frameworks have a strategic asset implication for those organizations who have acquired expertise in vertical markets such as manufacturing, accounting, or bio-technology would have a distribution mechanism for packaging, reselling, and deploying their expertise, and furthering the progress and dissemination of technology.

Historically, frameworks have only recently emerged as a mainstream concept on personal computing platforms. This migration has been assisted by the availability of object-oriented languages, such as C++. Traditionally, C++ was found mostly on UNIX systems and researcher's workstations, rather than on Personal Computers in commercial settings. It is languages such as C++ and other object-oriented languages, such as Smalltalk and others, that enabled a number of university and research projects to produce the precursors to today's commercial frameworks and class libraries. Some examples of these are InterViews from Stanford University, the Andrew toolkit from Carnegie-Mellon Universtiy and University of Zurich's ET++ framework.

There are many kinds of frameworks depending on the level of the system and the nature of the problem. The types of frameworks range from application frameworks that assist in developing the user interface, to lower level frameworks that provide basic system software services such as communications, printing, file system support, graphics, etc. Commercial examples of application frameworks are MacApp (Apple), Bedrock (Symantec), OWL (Borland), NeXTStep App Kit (NeXT), and Smalltalk-80 MVC (ParcPlace) to name a few.

Programming with frameworks requires a new way of thinking for developers accustomed to other kinds of systems. In fact, it is not like "programming" at all in the traditional sense. In old-style operating systems such as DOS or UNIX, the developer's own program provides all of the structure. The operating system provides services through system calls—The developer's program makes the calls when it needs the service and control returns when the service has been provided. The program structure is based on the flow-of-control, which is embodied in the code the developer writes.

When the frameworks are used, this is reversed. The developer is no longer responsible for the flow-of-control. The developer must forego the tendency to understand programming tasks in term of flow of execution. Rather, the thinking must be in terms of the responsibilities of the objects, which must rely on the framework to determine when the tasks should execute. Routines written by the developer are activated by code the developer did not write and that the developer never even sees. This flip-flop in control flow can be a significant psychological barrier for developers experienced only in procedural programming. Once this is understood, however, framework programming requires much less work than other types of programming.

In the same way that an application framework provides the developer with prefab functionality, system frameworks, such as those included in a preferred embodiment, leverage the same concept by providing system level services, which developers, such as system programmers, use to subclass/override to create customized solutions. For example, consider a multi-media framework which could provide the foundation for supporting new an diverse devices such as audio, video, MIDI, animation, etc. The developer that needed to support a new kind of device would have to write a device driver. To do this with a framework, the developer only needs to supply the characteristics and behavior that is specific to that new device.

The developer in this case supplies an implementation for certain member functions that will be called by the multi-media framework. An immediate benefit to the developer is that the generic code needed for each category of device is already provided by the multi-media framework. This means less code for the device driver developer to write, test, and debug. Another example of using system framework would be to have separate I/O frameworks for SCSI devices, NuBus cards, and graphics devices. Because there is inherited functionality, each framework provides support for common functionality found in its device category. Other developers could then depend on these consistent interfaces to all kinds of devices.

A preferred embodiment takes the concept of frameworks and applies it throughout the entire system. For the commercial or corporate developer, system integrator, or OEM, this means all the advantages that have been illustrated for a framework such as MacApp can be leveraged not only at the application level for such things as text and user interfaces, but also at the system level, for services such as graphics, multi-media, file systems, I/O, testing, etc.

Application creation in the architecture of a preferred embodiment is essentially be like writing domain-specific puzzle pieces that adhere to the framework protocol. In this manner, the whole concept of programming changes. Instead of writing line after line of code that calls multiple API hierarchies, software will be developed by deriving classes from the preexisting frameworks within this environment, and then adding new behavior and/or overriding inherited behavior as desired.

Thus, the developer's application becomes the collection of code that is written and shared with all the other framework applications. This is a powerful concept because developers will be able to build on each other's work. This also provides the developer the flexibility to customize as much or as little as needed. Some frameworks will be used just as they are. In some cases, the amount of customization will be minimal, so that puzzle piece the developer plugs in will be small. In other cases, the developer may make very extensive modifications and create something completely new. In a preferred embodiment, as shown in FIG. 1, a program resident in the RAM 14, and under the control of the CPU 10, is responsible for managing various tasks using an object oriented framework. In the framework, an item to be added/removed from a system is called a component. A component can be a document, a font, a tool, a shared library, etc.

A component can have properties associated with it. Every component has some set of properties which identify it. A component may have dependencies. The set of dependencies may vary from system to system for the same component. Determining and resolving these dependencies involves second-guessing a user's intention and a target system's configuration. For example, the system would have to determine which system a user will install this component in and what existing components the system has. The system is designed to enable a user to add components without running an installation program. To support this goal, an installation program is replaced with a location framework that provides the following capabilities:

System software can locate components whose properties match those specified to the location framework (e.g., all components of type tool).

System software can register interest in and receive notification on the addition/removal of components whose properties match those specified to the location framework.

The location framework has no user interface. Clients of the location framework, e.g., the plate framework will provide a user interface to take advantage of the location framework capabilities.

ARCHITECTURE

The location framework is designed to be extensible. It contains logic for locating components in a system, and determining how to notify a system when a component is added or removed. A key abstraction in the location framework is the locator class. Its semantics are defined by the abstract base class TComponentLocator. Concrete subclasses may use different searching mechanisms (the how of the location framework—file system properties, hardware capabilities, etc.) and may return different collections of objects (the what of the location framework—file system entities, hardware objects, etc.). A concrete subclass using TPropertyQuery and returning a collection of TFSEntity objects is TFileLocator. Clients of the location framework can register interest in and receive notification on the addition/removal of components whose properties match those specified to a locator. Clients can use the following abstractions from the notification framework: TNotifierConnection, TInterest, and TNotification. TNotifierConnection provides the connection between a client and a locator. The interest is specified in a subclass of TInterest. The notification is received in a subclass of TNotification. Every component has some set of properties which identify it. System software may attach properties to components to group specific components into specific folders. By matching the properties of a component with those of a folder, system software can determine where to put components. In a future release, users may also attach user-defined properties to components.

Flow Charts In Accordance With a Preferred Embodiment

Figure 2:
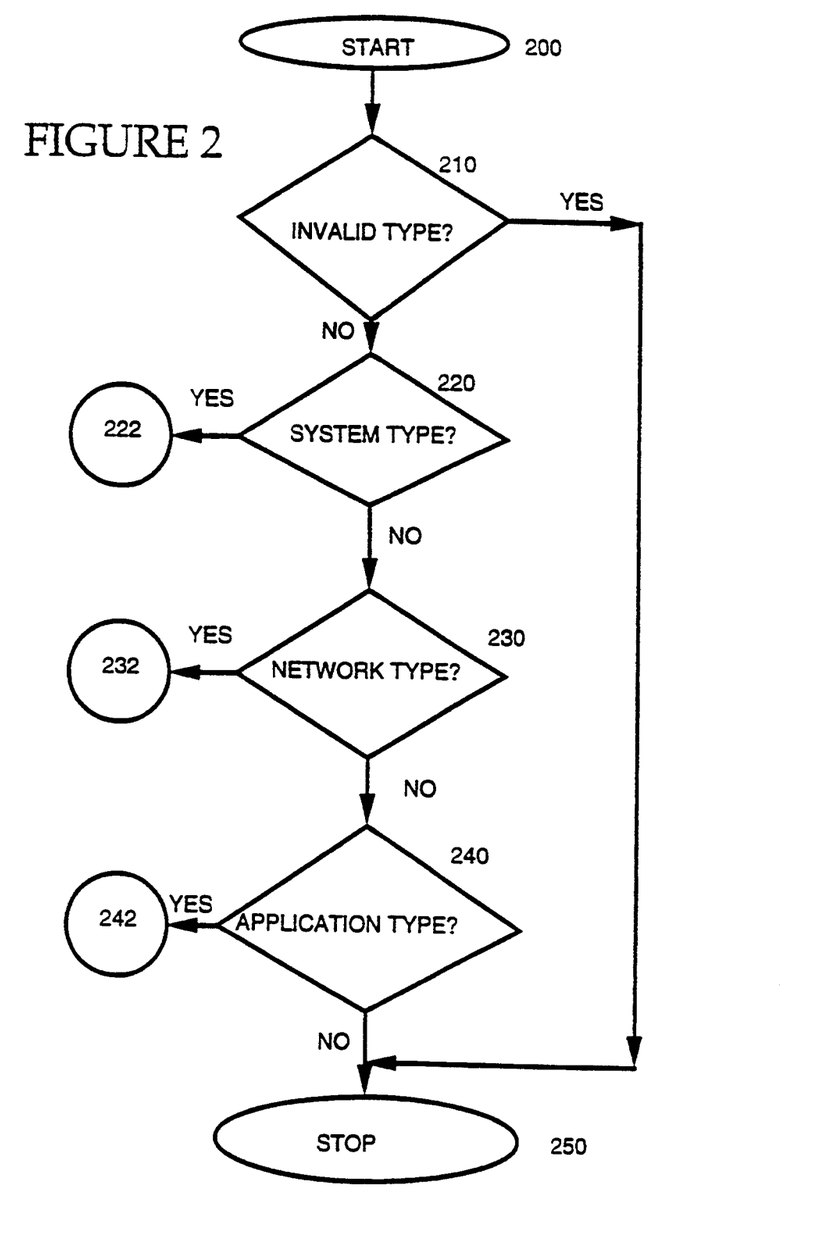
FIG. 2 is a flowchart of the logic associated with checking types of locator requests in accordance with a preferred embodiment.

FIG. 2 is a flowchart of the logic associated with checking types of locator requests in accordance with a preferred embodiment. Processing commences at terminal 200 which immediately passes control to decision block 210 to determine if an invalid type has been encountered. If so, then an appropriate error message is presented and processing is terminated at terminal 250. If not, then at decision block 220, a test is performed to determine if the locator request is for a system entity. If so, then control is passed via terminal 222 to FIG. 3 to determine the specific system entity involved. If not, then another test is performed at decision block 230 to determine if the locator request is for a network entity. If so, then control is passed via terminal 232 to FIG. 4 to determine the specific network entity involved. If not, then another test is performed at decision block 240 to determine if the locator request is for an application entity. If so, then control is passed via terminal 232 to FIG. 5 to determine the specific application entity involved. If not, then an error condition is noted and control is returned via terminal 250.

Figure 3:
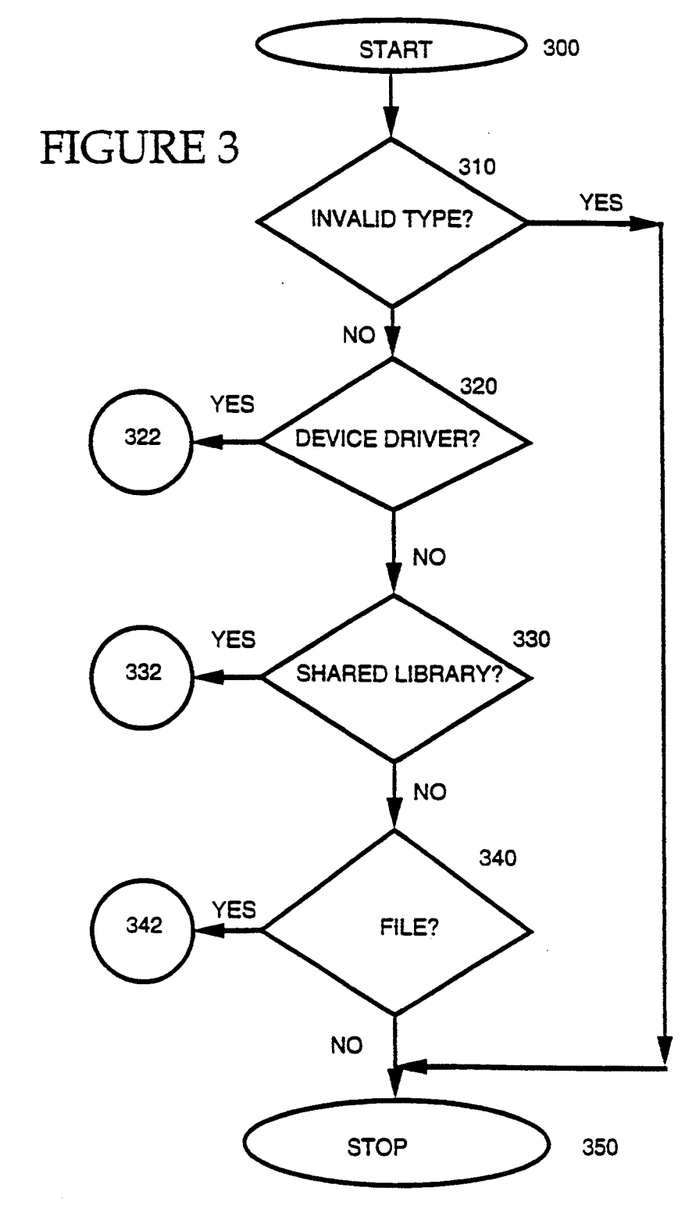
FIG. 3 is a flowchart of the logic associated with determining a specific type of system locator request in accordance with a preferred embodiment.

FIG. 3 is a flowchart of the logic associated with determining the specific system entity that the locator request is associated with. Processing commences at terminal 300 and immediately passes to decision block 310 to determine if an invalid type has been specified. If so, then an appropriate error message is presented and control returned via terminal 350. If not, then a test is performed at decision block 320 to determine if a device driver locator is the specific system locator involved. If so, then control passes via terminal 322 to FIG. 6 to process the device driver locator. If not, then a test is performed at decision block 330 to determine if a shared library locator is the specified system locator involved. If so, then control passes via terminal 322 to FIG. 6 to process the shared library locator. If not, then a test is performed at decision block 340 to determine if a file locator is the specific system locator involved. If so, then control passes via terminal 342 to FIG. 6 to process the file locator. If not, then an appropriate error message is presented and control returned via terminal 350.

Figure 4:
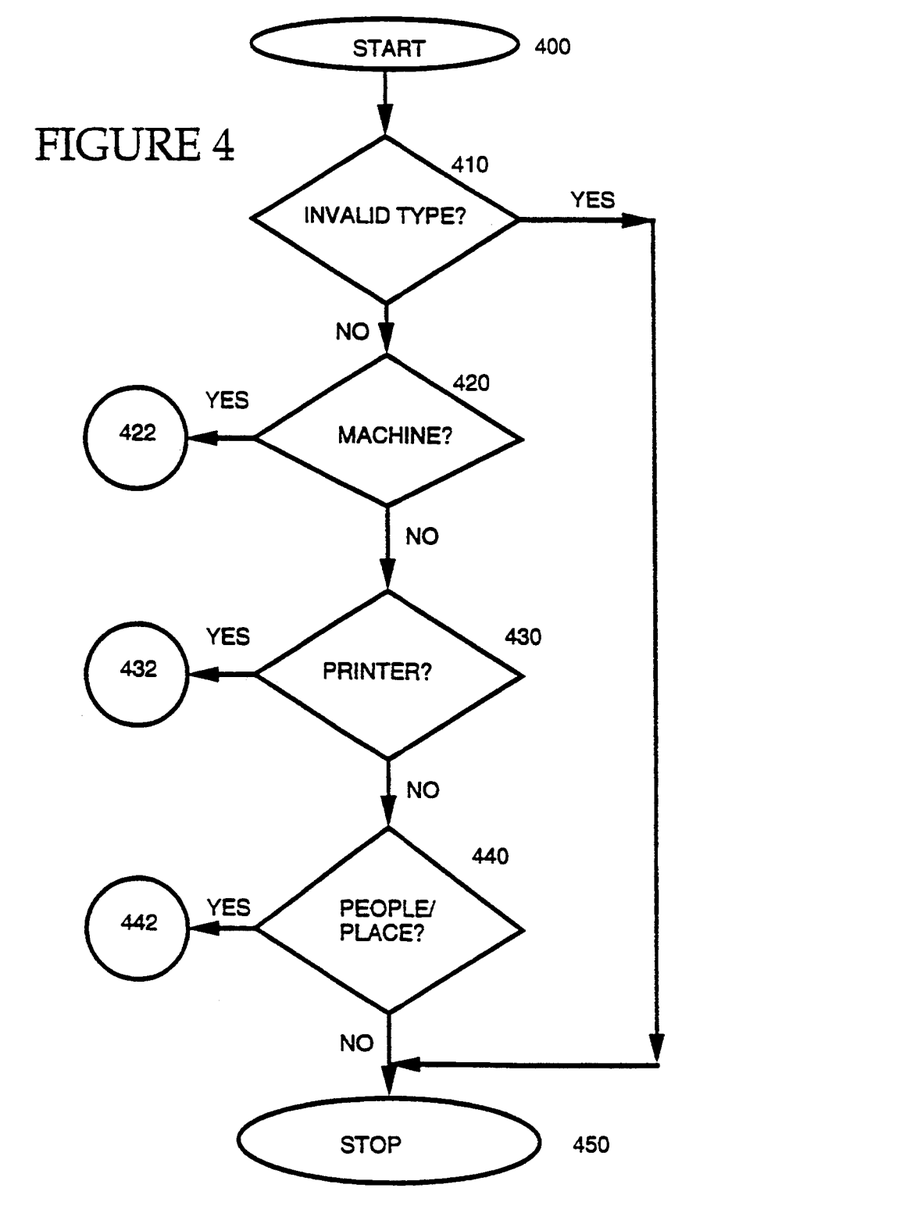
FIG. 4 is a flowchart of the logic associated with determining a specific type of network locator request in accordance with a preferred embodiment.

FIG. 4 is a flowchart of the logic associated with determining a specific type of network locator request in accordance with a preferred embodiment. Processing commences at terminal 400 and immediately passes to decision block 410 to determine if an invalid type has been specified. If so, then an appropriate error message is presented and control returned via terminal 450. If not, then a test is performed at decision block 420 to determine if a machine locator is the specific network locator involved. If so, then control passes via terminal 422 to FIG. 7 to process the machine locator. If not, then a test is performed at decision block 430 to determine if a printer locator is the specific network locator involved. If so, then control passes via terminal 422 to FIG. 7 to process the printer locator. If not, then a test is performed at decision block 430 to determine if a people/place locator is the specific network locator involved. If so, then control passes via terminal 432 to FIG. 7 to process the people/place locator. If not, then an appropriate error message is presented and control returned via terminal 450.

Figure 5:
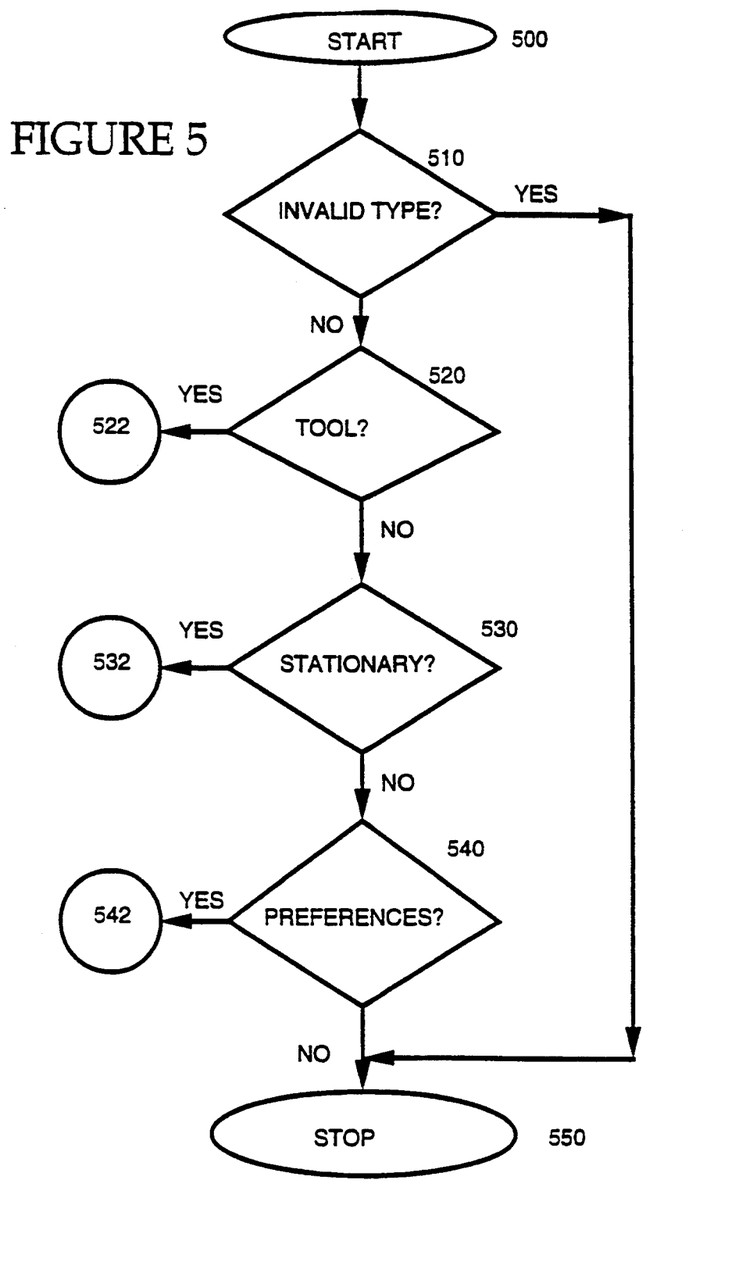
FIG. 5 is a flowchart of the logic associated with determining a specific type of application locator request in accordance with a preferred embodiment.

FIG. 5 is a flowchart of the logic associated with determining a specific type of application locator request in accordance with a preferred embodiment. Processing commences at terminal 500 and immediately passes to decision block 510 to determine if an invalid type has been specified. If so, then an appropriate error message is presented and control returned via terminal 550. If not, then a test is performed at decision block 520 to determine if a tool locator is the specific application locator involved. If so, then control passes via terminal 522 to FIG. 8 to process the tool locator. If not, then a test is performed at decision block 530 to determine if a stationary locator is the specific application locator involved. If so, then control passes via terminal 522 to FIG. 8 to process the stationary locator. If not, then a test is performed at decision block 530 to determine if a preferences locator is the specific application locator involved. If so, then control passes via terminal 532 to FIG. 8 to process the preferences locator. If not, then an appropriate error message is presented and control returned via terminal 550.

Figure 6:
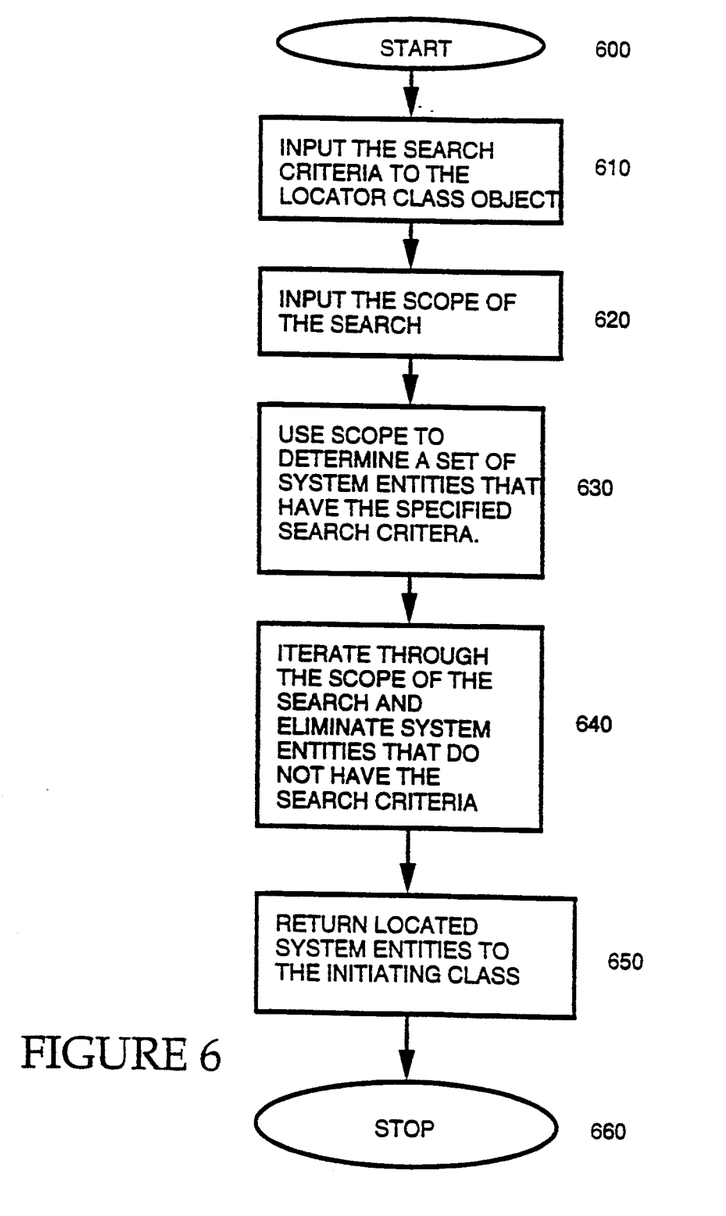
FIG. 6 is a flowchart of the logic associated with processing a system locator request in accordance with a preferred embodiment.

FIG. 6 is a flowchart of the logic associated with processing a system locator request in accordance with a preferred embodiment. Processing commences at terminal 600 and immediately passes to function block 610 to obtain the search criteria for the locator class object. Then, at function block 620, the scope of the search is input, and at function block 630 the scope is used to determine a set of system entities meeting the indicated search criteria. Next, at function block 640, the search is performed to locate appropriate system entities, which are returned via function block 650 to the initiating class, and processing is terminated at terminal 600.

Figure 7:
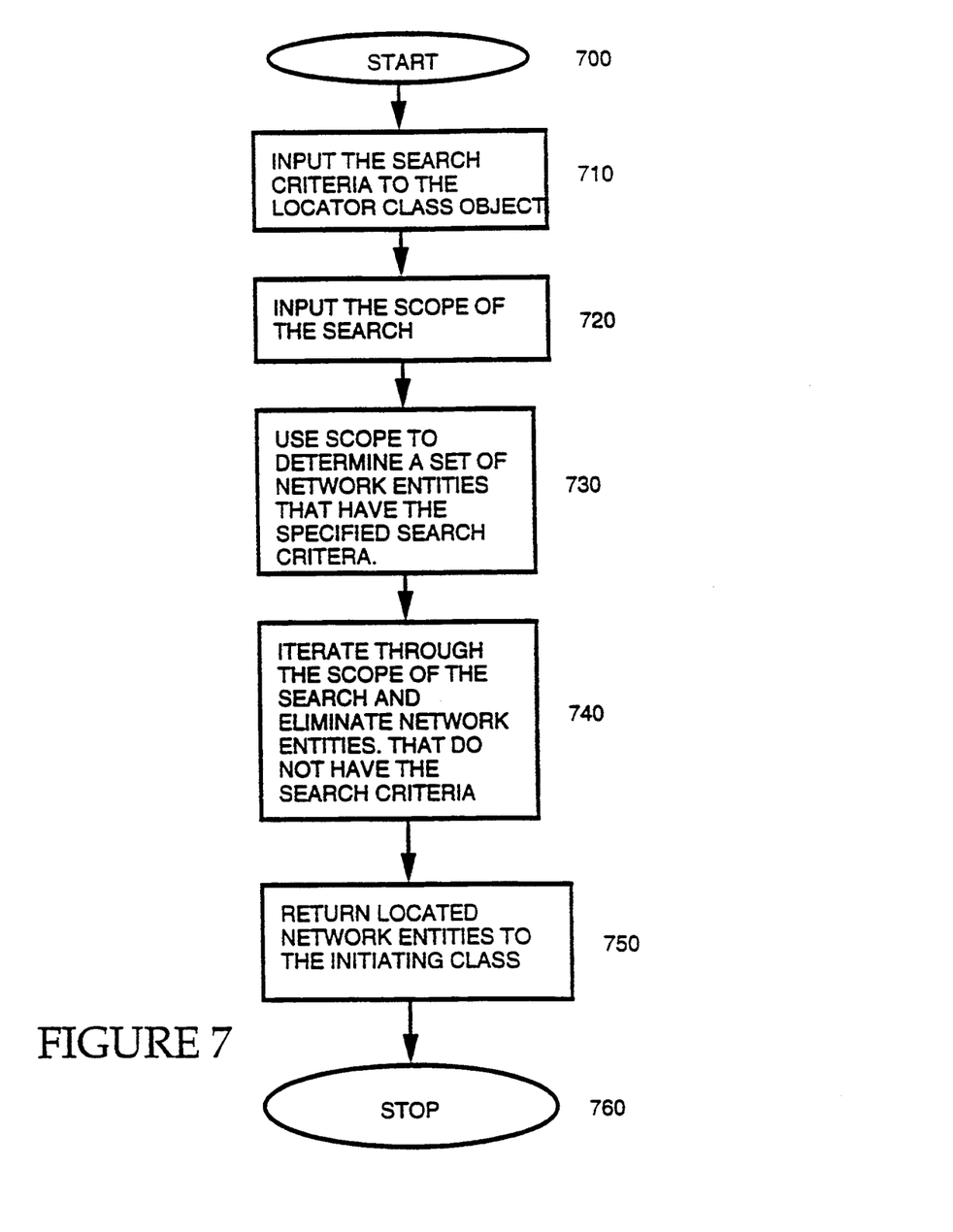
FIG. 7 is a flowchart of the logic associated with processing a network locator request in accordance with a preferred embodiment.

FIG. 7 is a flowchart of the logic associated with processing a network locator request in accordance with a preferred embodiment. Processing commences at terminal 700 and immediately passes to function block 710 to obtain the search criteria for the locator class object. Then, at function block 720, the scope of the search is input, and at function block 730 the scope is used to determine a set of network entities meeting the indicated search criteria. Next, at function block 640, the search is performed to locate appropriate network entities, which are returned via function block 650 to the initiating class, and processing is terminated at terminal 600.

Figure 8:
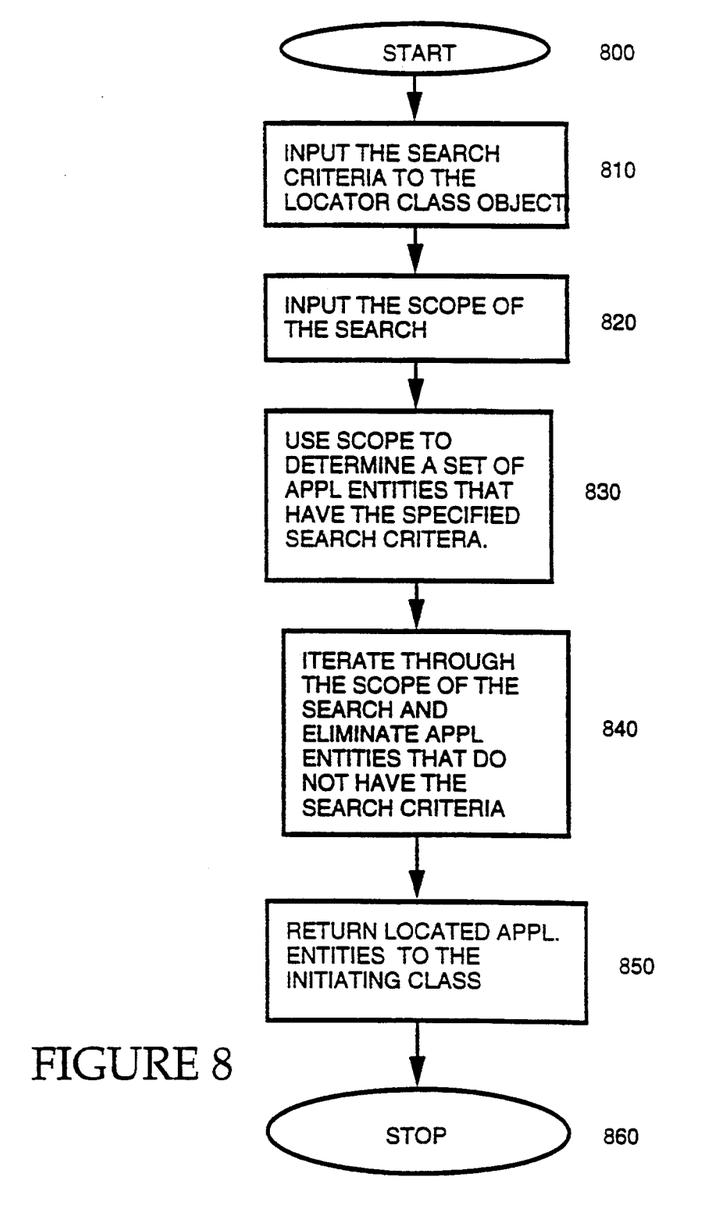
FIG. 8 is a flowchart of the logic associated with processing an application locator request in accordance with a preferred embodiment.

FIG. 8 is a flowchart of the logic associated with processing an application locator request in accordance with a preferred embodiment. Processing commences at terminal 800 and immediately passes to function bock 810 to obtain the search criteria for the locator class object. Then, at function block 820, the scope of the search is input, and at function block 830 the scope is used to determine a set of application entities meeting the indicated search criteria. Next, at function block 840, the search is performed to locate appropriate application entities, which are returned via function block 850 to the initiating class, and processing is terminated at terminal 860.

Mechanisms

Different concrete subclasses of TComponentLocator may use different mechanisms for searching. The mechanism used by TFileLocator is TPropertyQuery. Other Mechanisms could be used by the location framework. For example, if THardwareCapability is available as a mechanism, a new subclass could be developed: THardwareCapabilityLocator.

CLASS DESCRIPTIONS

TComponentLocator

Purpose

TComponentLocator is a templatized pure abstract base class that defines the protocol for locating components in a system. TComponentLocator subclasses must implement the protocol defined by TComponentLocator.

Instantiation

TComponentLocator is a pure abstract base class

Deriving Classes

Classes which require locating a specified item within a specified scope may derive from TComponentLocator. Each subclass can use a different searching mechanism.

Concurrency

TComponentLocator is a pure abstract base class. Subclasses are not required to be multi-thread safe since locators are not normally shared.

Resource Use

TComponentLocator is a pure abstract base class. TComponentLocator subclasses must manage any resources used by their implementation.

Class Interface

```
template <class AResult>
class TComponentLocator {
public:
    virtual Boolean      FindAll(TCollection<AResult>& theResult) = 0;
    virtual AResult      FindOne(const TText& theName) = 0;
    virtual TInterest*   CreateAddedInterest( ) = 0;
    virtual TInterest*   CreateRemovedInterest( ) = 0;
}
```

Method Descriptions

*virtual Boolean FindALL(TCollection<AResult>& the result)=0;*

This method is a pure virtual function to be used polymorphically. Its purpose is to find all the components within a scope and whose properties match those specified to the locator. The search scope can be a volume, a machine, or anything supported by a subclass. The search condition can be a property query, a hardware capability, or anything depending on the implementation provided by a subclass. The search result can be any kind of collection specified by a subclass. The search returns true if it finds some components.

*virtual AResult FindOne(const TText& theName)=0;*

This method is a pure virtual function to be used polymorphically. Its purpose is to find the named component whose properties match those specified to the locator.

*virtual TInterest* CreateAddedInterest()=0;*

This method is a pure virtual function to be used polymorphically. Its purpose is to create an interest a client can use to register with a locator for notification on the addition of components whose property values match that specified to the locator.

*virtual TInterest* CreateRemovedInterest()=0;*

This method is a pure virtual function to be used polymorphically. Its purpose is to create an interest a client can use to register with a locator for notification on the removal of components whose properties match those specified to the locator.

TFileLocator

Purpose

TFileLocator is a concrete subclass of TComponentLocator which implements the protocol defined by TComponentLocator.

The search scope of TFileLocator is a file system entity, TFSEntity. The search condition is a property query, TPropertyQuery. The search result is a collection of file system entities or a single file system entity.

TFileLocator depends on the file system implementation of properties.

Instantiation

TFileLocator may be instantiated to provide a full implementation of the protocol defined by TComponentLocator.

Deriving Classes

TFileLocator should be subclassed if a different implementation of properties is used.

Concurrency

Instances of TFileLocator should not be shared and are not required to be multi-thread safe.

Resource Use

TFileLocator manages storage for all objects it creates.

Class Interface

```
class TFileLocator: public MCollectible, public TComponentLocator<TFSEntity> {
public:
    // locator type
    static const TToken& kKind;
    // Change notifications.
    static const TToken&   kAddedFile;
    static const TToken&   kRemovedFile;
    // constructors and destructors.
    TFileLocator(const TFSEntity& theScope, const TPropertyQuery& theCondition);
    virtual ~TFileLocator( );
    // TComponentLocator methods.
    virtual Boolean      FindAll(TCollection<TFSEntity>& theResult);
    virtual TFSEntity    FindOne(const TText& theName);
    virtual TInterest*   CreateAddedInterest( );
    virtual TInterest*   CreateRemovedInterest( );
    // new methods.
    TFSEntity            GetScope( ) const;
    TPropertyQuery       GetCondition( ) const;
```

}

Method Description

*virtual Boolean FindAll(TCollection<TFSEntity>& theResult);*

This method is overridden to locate file system entities within volumes or directories. The search returns true if it finds a collection of one or more file system entities whose properties match the specified property query.

*virtual TFSEntityFindOne(const TText& theName);*

This method is overridden to locate the named file system entity whose properties match the specified property query.

*virtual TInterest\* CreateAddedInterest();*

This method is overridden to create an interest a client can use to register with a file locator for notification on the addition of file system entities whose properties match the specified property query.

*virtual TInterest\* CreateRemovedInterest();*

This method is overridden to create an interest a client can use to register with a file locator for notification on the removal of file system entities whose properties match the specified property query.

EXAMPLE

The following example illustrates how a developer could use the location framework. The example shows TFontFileLocator containing a TFileLocator. An alternative is to inherit TFontFileLocator from TFileLocator. The declaration of the class TFontFileLocator is shown below TFontFileLocator wants to locate files containing fonts.

```
class TFontFileLocator:        public TComponentLocator<TFSEntity> {
public:
        // constructors and destructors.
            TFontFileLocator(const TVolume& aScope);
            ~TFontFileLocator( );
        // TComponentLocator methods.
        virtual Boolean          FindAll(TCollection<TFSEntity>&
                                 theResult);
        virtual TFSEntity        FindOne(const TText& theName);
        virtual TInterest*       CreateAddedInterest( );
        virtual Tinterest*       CreateRemovedInterest( );
private:
        TFileLocator   fLocatorService;
}
TFontFileLocator constructor constructs a locator service with the specified scope.
TFontFileLocator::TFontFileLocator(const TVolume& aScope)
        : fLocatorService(TFileLocator(aScope, (TFont::kFontID).Exists( )))
{
}
TFontFileLocator destructor does not need to do anything.
TFontFileLocator::~TFontFileLocator( )
{
}
TFontFileLocator::FindAll uses the locator service to perform the search.
Boolean
TFontFileLocator::FindAll(TCollection<TFSEntity>& theResult)
{
        return (fLocatorService.FindAll(theResult));
}
TFontFileLocator::FindOne uses the locator service to find the named font file.
TFSEntity
TFontFileLocator::FindOne(const TText& theName)
{
        return (fLocatorService.FindOne(theName));
}
TFontFileLocator::CreateAddedInterest creates an interest a client can use to
register with the locator service for notification on the addition of font files.
TInterest*
TFontFileLocator::CreateAddedInterest( )
{
        return (fLocatorService.CreateAddedInterest( ));
}
TFontFileLocator::CreateRemovedInterest creates an interest a client can use to
register with the locator service for notification on the removal of font files.
TInterest*
TFontFileLocator::CreateRemovedInterest( )
{
        return (fLocatorService.CreateRemovedInterest( ));
}
```

Figure 9:
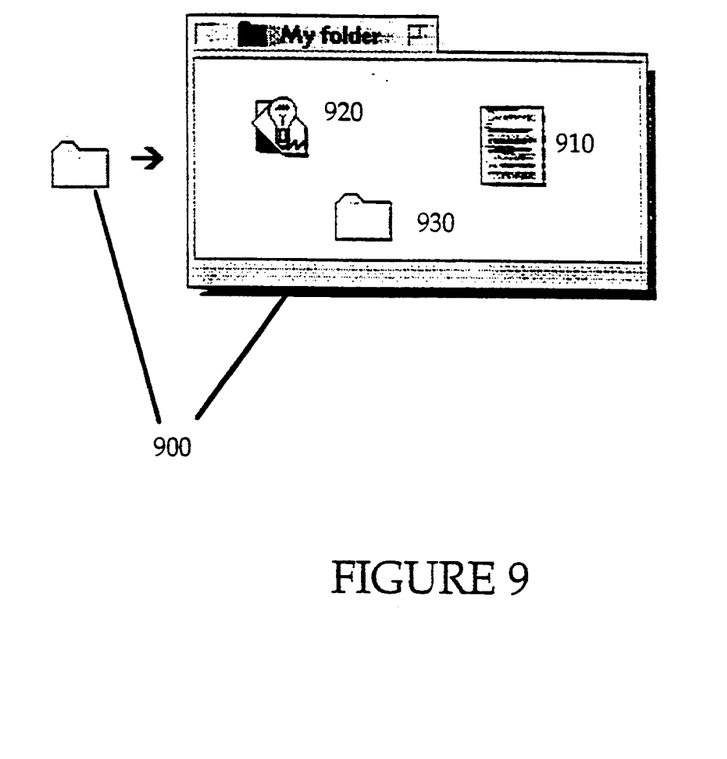
FIG. 9 is an illustration of a smart folder in accordance with a preferred embodiment.

FIG. 9 is an illustration of a smart folder 900, which uses a locator to organize documents 910, graphic objects 920, folders 930, etc., which a user is interested in collecting together. The smart folder then invokes the locator and requests particular documents containing the desired attributes to be collected in the folder. Additionally, the smart folder can instruct the locator to notify it when new documents containing the desired attributes are added to or removed from the system.

Figure 10:
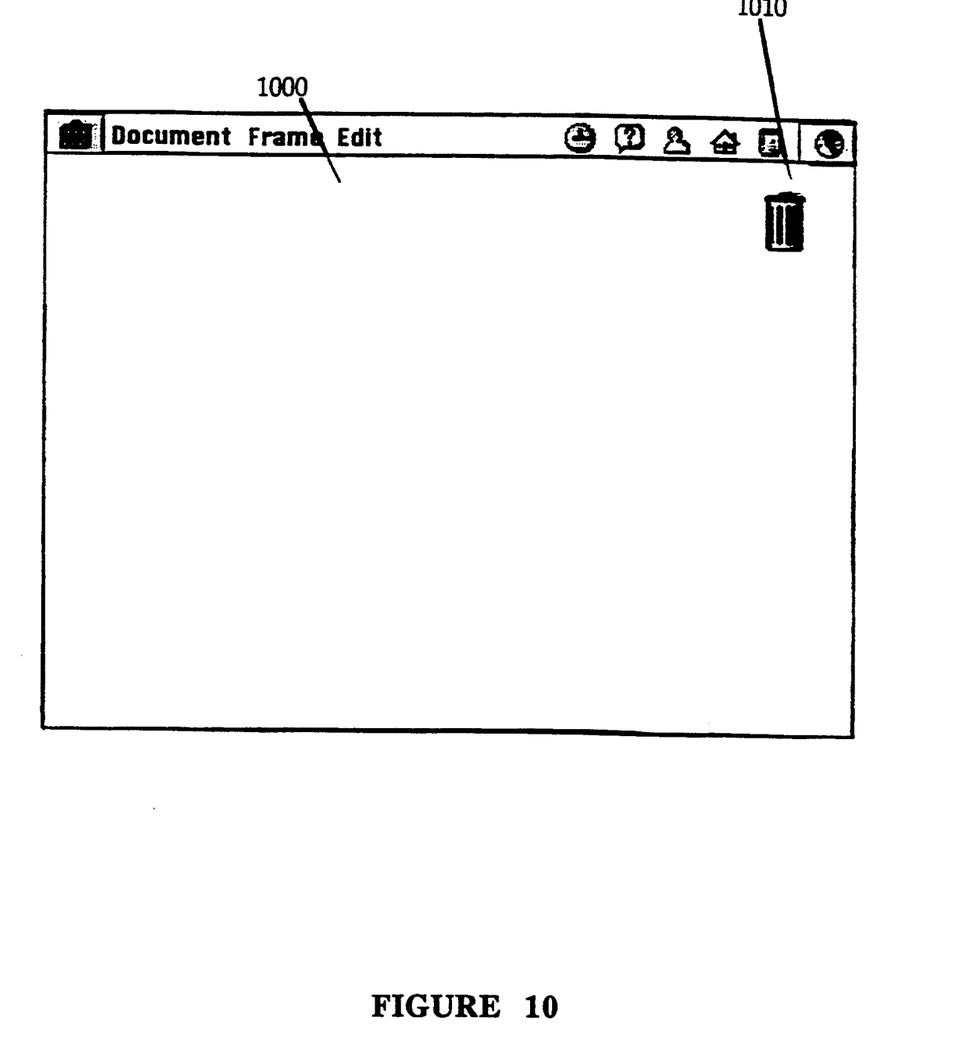
FIG. 10 is a simulation of a display of a place in accordance with a preferred embodiment.

FIG. 10 is a simulation of a display of a place in accordance with a preferred embodiment. A place 1000 uses a locator to find and display the associated trash can 1010 for use in the plate. This is accomplished by the system attaching system-defined attributes to the trash. The plate then invokes the locator and requests the particular trash containing the desired attributes to be used in the place. The locator returns the appropriate trash can which is displayed.

Figure 11:
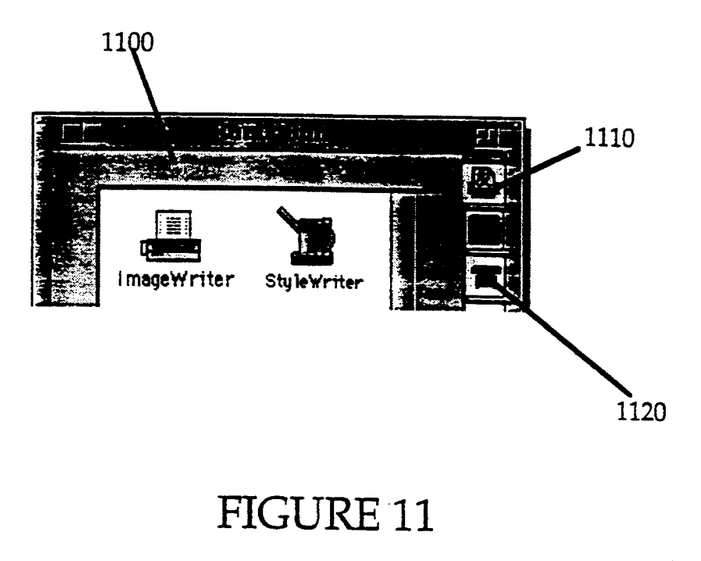
FIG. 11 is a simulation of a Parts Bin display in accordance with a preferred embodiment.

FIG. 11 is a simulation of a Parts Bin display in accordance with a preferred embodiment. The parts bin 1100 uses locators to find all of the "potentially" connectable devices. This is accomplished by the system attaching system-defined attributes to these devices. The parts bin then invokes the locators and requests the particular devices containing the desired attributes to be catalogued in the parts bin. The parts bin presentation consists of a window 1100 which has a tab for each device type. For example, tabs will be provided for printers 1110 and modems 1120. A user can select a printer tab to see all the printers (found by a printer-device locator).

While the invention has been described in terms of a preferred embodiment in a specific system environment, those skilled in the art will recognize that the invention can be practiced, with modification, in other and different hardware and software environments within the spirit and scope of the appended claims.

Having thus described our invention, what we claim as new, and desire to secure by Letters Patent is:

1. A computer implemented method for dynamically adding support for hardware or software components with one or more properties to an operating system active on a computer with a memory, comprising the steps of:
   (a) specifying a target hardware or software component search criteria including one or more properties;
   (b) querying the operating system to identify one or more hardware or software components that meet the target hardware or software component search criteria;
   (c) returning hardware or software components meeting the target hardware or software component search criteria; and
   (d) adding support for the hardware and software components to the operating system without re-booting the operating system.

2. A method as recited in claim 1, including the step of specifying a scope of search to further limit the hardware and software components meeting the target hardware or software component search criteria.

3. A method as recited in claim 1, wherein the hardware or software components include system components.

4. A method as recited in claim 1, wherein the hardware or software components include network components.

5. A method as recited in claim 1, wherein the software components include application components.

6. A method as recited in claim 1, including the step of dynamically removing the hardware or software component meeting the target hardware or software component search criteria to disable the hardware or software component without rebooting the operating system.

7. A method as recited in claim 1, including the step of dynamically adding the hardware or software component meeting the target hardware or software component search criteria to the operating system without re-booting the operating system.

8. A method as recited in claim 1, wherein the software component includes a specific trash can associated with a software component place.

9. A method as recited in claim 1, including the step of utilizing a menu bar associated with a menu displayed on a display for selecting a locator entity.

10. A method as recited in claim 1, including the step of creating a list of component pointers which provide direct access to the components.

11. A method as recited in claim 1, including the step of dynamically removing a software component meeting the target software component search criteria to disable a font without re-booting the operating system.

12. A method as recited in claim 1, including the step of dynamically adding a software component meeting the target software component search criteria to enable a font without re-booting the operating system.

13. An apparatus for dynamically adding support for hardware or software components with one or more properties to an operating system active on a computer with a memory, comprising:
   (a) means for specifying a target hardware or software component search criteria including one or more properties;
   (b) means for querying the operating system to identify one or more hardware or software components that meet the target hardware or software component search criteria;
   (c) means for returning hardware or software components meeting the target hardware or software component search criteria; and
   (d) means for adding support for the hardware and software components to the operating system without rebooting the operating system.

14. An apparatus as recited in claim 13, including means for specifying a scope of search to further limit the hardware and software components meeting the target hardware or software component search criteria.

15. An apparatus as recited in claim 13, wherein the hardware or software components include system components.

16. An apparatus as recited in claim 13, wherein the hardware or software components include network components.

17. An apparatus as recited in claim 13, wherein the software components include application components.

18. An Apparatus as recited in claim 13, including means for dynamically adding the hardware or software component meeting the target hardware or software component search criteria to enable the hardware or software component without rebooting the operating system.

19. An apparatus as recited in claim 13, including means for dynamically removing the hardware or software component meeting the target hardware or software component search criteria to disable the hardware or software component without rebooting the operating system.

20. An apparatus as recited in claim 13, wherein the software component includes a specific trash can linked to a software component place.

21. An apparatus as recited in claim 13, including means for utilizing a menu bar associated with a menu displayed on a display for selecting a locator entity.

22. An apparatus as recited in claim 13, including means for creating a list of component pointers which provide direct access to the components.

23. An apparatus as recited in claim 13, including means for creating a folder with default information identified to a locator.

* * * * *